US008099776B2

(12) United States Patent
Jalava et al.

(10) Patent No.: US 8,099,776 B2
(45) Date of Patent: Jan. 17, 2012

(54) PERSONALIZED FIREWALL

(75) Inventors: Mika Jalava, Siuntio (FI); Tuomo Syvänne, Vantaa (FI)

(73) Assignee: Stonesoft Corporation, Helsinki (FI)

( * ) Notice: Subject to any disclaimer, the term of this patent is extended or adjusted under 35 U.S.C. 154(b) by 1968 days.

(21) Appl. No.: 10/301,858

(22) Filed: Nov. 22, 2002

(65) Prior Publication Data

US 2003/0118038 A1 Jun. 26, 2003

(30) Foreign Application Priority Data

Nov. 29, 2001 (EP) .................................... 01660219

(51) Int. Cl.
*H04L 29/06* (2006.01)
(52) U.S. Cl. ............................. 726/13; 726/11; 707/745
(58) Field of Classification Search .................. 726/11, 726/13; 707/745
See application file for complete search history.

(56) References Cited

U.S. PATENT DOCUMENTS

| | | | | |
|---|---|---|---|---|
| 5,884,033 A * | 3/1999 | Duvall et al. | ................. | 709/206 |
| 6,009,475 A * | 12/1999 | Shrader | ......................... | 709/249 |
| 6,105,027 A * | 8/2000 | Schneider et al. | ................. | 707/9 |
| 6,158,008 A * | 12/2000 | Maria et al. | ..................... | 726/13 |
| 6,178,422 B1 * | 1/2001 | Tada et al. | ......................... | 707/9 |
| 6,330,610 B1 * | 12/2001 | Docter et al. | ................. | 709/229 |
| 6,438,695 B1 * | 8/2002 | Maufer | ............................ | 726/11 |
| 6,574,666 B1 * | 6/2003 | Dutta et al. | ................... | 709/227 |
| 6,678,283 B1 * | 1/2004 | Teplitsky | ....................... | 370/463 |
| 6,701,432 B1 * | 3/2004 | Deng et al. | ..................... | 713/153 |
| 6,772,214 B1 * | 8/2004 | McClain et al. | ............... | 709/229 |
| 6,772,348 B1 * | 8/2004 | Ye | ..................... | 726/13 |
| 6,795,917 B1 * | 9/2004 | Ylonen | ......................... | 713/160 |
| 7,107,612 B1 * | 9/2006 | Xie et al. | ......................... | 726/13 |
| 7,136,926 B1 * | 11/2006 | Iyer et al. | ....................... | 709/229 |
| 7,207,062 B2 * | 4/2007 | Brustoloni | ....................... | 726/13 |
| 2002/0053029 A1 * | 5/2002 | Nakamura et al. | ............. | 713/201 |
| 2002/0078377 A1 * | 6/2002 | Chang et al. | .................. | 713/201 |
| 2002/0080789 A1 * | 6/2002 | Henderson et al. | ........... | 370/392 |
| 2002/0124090 A1 * | 9/2002 | Poier et al. | ..................... | 709/228 |
| 2002/0186661 A1 * | 12/2002 | Santiago et al. | ............... | 370/252 |
| 2003/0028674 A1 * | 2/2003 | Boden | ............................ | 709/250 |
| 2004/0181690 A1 * | 9/2004 | Rothermel et al. | ........... | 713/201 |

FOREIGN PATENT DOCUMENTS

| | | |
|---|---|---|
| EP | 1 143 660 | 10/2001 |
| WO | WO 99/57866 | 11/1999 |

* cited by examiner

*Primary Examiner* — Kambiz Zand
*Assistant Examiner* — Michael Guirguis
(74) *Attorney, Agent, or Firm* — Barnes & Thornburg LLP

(57) ABSTRACT

A personalized firewall or other network gateway is provided by a method of matching a data packet to a rule in a network gateway having a rule base. One or more identification values are determined based on the data packet and property value(s) associated with said one or more identification values are queried and received from a property server. The property value(s) describe for example allowed connections and services for an entity associated with the identification value(s). The property value(s) are compared to at least one rule in the rule base, said at least one rule comprising property value(s) and an action, and the action defined in said at least one rule is taken, if said property value(s) of the rule match corresponding property value(s) associated with said one or more identification values.

20 Claims, 6 Drawing Sheets

| RULE # | SRC ADDR | DST ADDR | SERVICE | ACTION |
|---|---|---|---|---|
| 1 | any | 172.16.1.10 | http | allow |
| 2 | any | any | http | deny |
| 3 | 10.1.1.0 | 192.168.1.1 | ftp | allow |
| 4 | 10.1.1.0 | any | telnet | allow |
| 5 | any | any | any | deny |

| RULE # | SRC | DST | SERVICE | ACTION |
|---|---|---|---|---|
| ... | ... | ... | ... | ... |
| N+1 | - addr belongs to network 10.1.1.0 /24<br>- outbound TCP allowed<br>- proxy services | 192.168.1.2 | http-proxy | allow |
| N+2 | is a user | any | http | deny |
| N+3 | outbound TCP allowed | any | ftp | allow |
| N+4 | any | inbound TCP allowed | tcp | allow |
| ... | ... | ... | ... | ... |

PERSONALIZED FIREWALL

FIELD OF THE INVENTION

The present invention relates to network security and, more particularly, to firewalls or security gateways.

BACKGROUND OF THE INVENTION

Typically, various organizations protect their internal networks by means of a firewall, which connects the internal network of the organization to public networks and filters and selectively discards the data packets entering and exiting the internal network according to predefined rules. Thus, a firewall is a gateway which operates at the same time as a connector and a separator between the networks in a sense that the firewall keeps track of the traffic that passes through it from one network to another and restricts connections and packets that are defined as unwanted by the administrator of the system. Physically a firewall is a machine with appropriate software to do the tasks assigned to it. It can be a router, a personal computer (PC), or whatever that can be used for such purposes.

Frequently, the filtering rules of a firewall are expressed as a table or list (rule base) of rules comprising data packet characteristics and related actions. Data packet characteristics are parameter values that are obtained from header field of a data packet and may be e.g. source IP (Internet Protocol) address, destination IP address and service (or protocol) or some other values. The action gives information about how to handle a data packet, which corresponds the data packet characteristics defined in the respective rule (i.e. which matches the rule). This means that for a data packet, which has the header information indicated in a rule, the action indicated in the rule is carried out. In a firewall, the action is typically deny or allow, which means the data packet is discarded or allowed to proceed, correspondingly.

The rules of a rule base are examined in certain order until a decision how to process the data packet is reached. The order of the rules in the rule base typically defines the order in which characteristics of a data packet are compared to the rules, that is, the rules are examined one by one from the beginning of the rule base. When a rule, to which the characteristics of a data packet match, is found, the action that is related to that rule is taken and often there is no need to continue examining the rules. However, the action defined in the rule may be conamining the rules. However, the action defined in the rule may be continue, in which case examining the rule base is continued from the next rule, or jump, in which case examining the rule base is continued from the rule specified in the jump action. The action of the firewall may be as well reject, which is similar to deny action. The difference is that deny action results in simply discarding the data packet and in reject the sender of the data packet is notified of discarding the data packet.

FIG. 1 illustrates as an example a rule base 10, having 5. rules. In each rule, a rule number, source IP address SRC ADDR, destination IP address DST ADDR, service (or protocol) and action are defined. However, this is only an example structure of rules, and also some other data packet characteristics may be defined in the rules. The rule #1. allows HTTP (HyperText Transfer Protocol) data from any address to a server with IP address 172.16.1.10.. All other HTTP traffic is denied with rule #2.. That is, if HTTP traffic does not match the rule #1, it is denied. Rules #3. and #4. allow FTP (File Transfer Protocol) traffic from network 10.1.1.0. to FTP server at IP address 192.168.1.15. and Telnet connections from network 10.1.1.10. to any address, respectively. The firewall rule bases are commonly designed to prohibit all that is not expressly permitted in the rules. Therefore, the last rule in the rule base is usually designed to deny any data packet. Rule #5 in the rule base 10. is such rule, that is, it denies data packets of related to any service from any source address to any destination address. So, if a data packet does not match any of the first four rules, it matches this last one and is denied.

In summary, when a data packet is received in the firewall, some of the header field values of the data packet are compared to the rules, which are stored in the firewall, and when a matching rule is found, the action related to the matching rule is taken.

Because all traffic intended to an internal network must pass through the firewall, most of the network security actions and policies can be concentrated in this particular point. This is of course a cost and administrative advantage, if the same policy can be used for a plurality of devices in the internal network. However, in some cases one firewall may be used for protecting plurality of independent subnetworks. For example, a Managed Service Provider (MSP) or a Managed Security Service Provider (MSSP) may offer firewall service to a plurality of customers by means of one firewall system. The problem in this approach is that the security requirements of different customers change frequently and when the configuration of one customer needs to be changed the configuration of the whole firewall needs to be changed and uploaded to the firewall again. This is a huge overhead in managing the firewall. Thus, there is a need for a "personalized" firewall configuration, that is, for possibility to flexibly alter firewall functionality associated to one user entity without need to reconfigure the whole firewall.

Another arrangement, where such personalized firewall is needed, is for example providing firewall service to a plurality of ADSL (Asymmetric Digital Subscriber Line) subscribers or wireless network users, the wireless network being for example GSM (Global System for Mobile communications), GPRS (General Packet Radio Service), or UMTS (Universal Mobile Telecommunications System). Such users usually do not want to or are not able to administer their own firewall, e.g. a personal firewall in their PC, but still require firewall protection. Additionally, In networks, where the IP address is dynamically addressed to a user, the address, which one user is using at a time, may change. An address may be assigned to a user by means of DHCP (Dynamic Host Configuration Protocol) or some other address assigning methods. In this case, the firewall is not generally interested in the IP address which originates or receives traffic, but rather the firewall needs to know who or what is using the address, since the IP address of one user may change over time, while the security requirements remain the same. This results in need of the personalization as well.

The closest solution for personalising a firewall that prior art has to offer is authentication of users. Authentication offers possibility to filter data packets according to users in addition to the IP address they are using at a time. The action in a rule may include the authentication of a user, that is, once the data packet matches a rule, the action may be: allow, if the user is X or if the user is one of X, Y, Z. Alternatively, authentication may be included in matching a data packet to a rule, that is, the rule matches only if authentication is successfully accomplished. Typically the user is requested to give his/her authentication credentials when a connection is attempted or the user has to authenticate separately in advance to opening connections through the firewall. This authentication can happen either in band (as a part of the protocol traffic) or out of band (using a separate channel). The authentication can be applied either to an IP address (one or more connections accepted from the same IP for a specified time) or a single connection.

There have also been attempts to provide a "single sign-on" (SSO) mechanism that fetches IP address-to-user (or user group) mapping information from an external system. That is, when a firewall processes a data packet, it takes the source IP address from the packet and queries from an external system identity of the user currently using that IP address. This enables the firewall administrator to write rules that have a user group as characteristics for identifying a data packet. This way, the source of the data packet in a rule may be a user group, and a data packet matches that rule if the user identity obtained from the external server belongs to the user group. Here the user does not need to authenticate separately for the firewall. Where this solution falls short is that the IP address-to-user binding must be refetched every time a data packet opening a new connection is processed. Also, the destination cannot be authenticated, since the authentication process requires user intervention and the receiver of some data may not be aware of the data arriving and thus cannot be assumed to be there to authenticate. Also, all users in one user group must have equal privileges, that is equal connections are allowed for them. Therefore, maintaining the user groups is tedious, especially if the rights one user has need to be changed and separate rule needs to be defined for each user group, which expands the rule base enormously. The alternative is to maintain separate rules for each user instead of a user group, but this clearly expands the rule base even more and clearly is not feasible.

However, authentication was originally designed to be used only rarely and causes a significant overhead both technically and especially to the users. This is especially true in case the exact identity of the user is required only for filtering the data the user is sending and not required for the service that is requested. For example, for simple web page browsing as such (sending and receiving HTTP data) does not usually require user identity, but it may be necessary for business purposes to allow this kind of traffic only to the customers paying for such a service, and therefore the user identity is required for filtering the traffic. Additionally, it is necessary to notice that authentication applies flexibly only to interactive, user-oriented traffic. Devices and software can also authenticate themselves, but this requires changes in the protocol that is used for changing information between the devices and therefore requires changes to both clients and servers. Thus it cannot be applied to existing systems without large modifications.

Due to above described deficiencies, authentication is not well suited to be used in connection with all users and all connections and thus not well suited for personalising a firewall. Therefore, currently there is no solution for truly personalizing a firewall.

SUMMARY OF THE INVENTION

An object of the invention is to fulfill the need described above by providing a personalized firewall and a method used therein.

The objects of the invention are achieved according to the invention as disclosed in the attached independent claims. Preferred embodiments of the invention are disclosed in the dependent claims. The features described in one dependent claim may be further combined with features described in another dependent claim to produce further embodiments of the invention.

In order to provide more flexible and better performing personalization of a firewall rule base, the prior art method of matching IP and/or transport header fields of a data packet to rules is expanded according to the invention with a method of using a set of property values associated to the data packet and matching those property values to rules. That is, in addition to "traditional rules", new kind of rules are introduced.

The idea of the invention is to assign a set of property values to an IP address or some other identifying value related to a data packet. The properties used in different implementations may vary according to the need. Each organisation or individual user using a firewall system that is based on the invention may define their own properties and respective firewall rules as well as the values for the properties according to their security policies.

The invention relates to a method of matching a data packet to a rule in a network gateway having a rule base. According to the invention one or more identification values are determined on the basis of the data packet, and property value(s) associated with said one or more identification values are queried and received. The property value(s) are compared to at least one rule in the rule base, said at least one rule comprising property value(s) and an action, and the action defined in said at least one rule is taken, if said property value(s) of the rule match corresponding property value(s) associated with said one or more identification values.

If the property value(s) of the rule do not match corresponding property value(s) associated with said one or more identification values, the next rule in the rule base is processed and the property value(s) are used again if the rule requires so.

The property value(s) are originally queried from a predefined external system, "a property server". The property server may be however running in the same device with the firewall itself, for example as a separate database. The firewall requests the information by an identification value and receives a set of property values (one or more) associated with the identification value. Identification value(s) may be determined by extracting one or more characterizing values (payload or header field values) from a data packet and then mapping the characterizing value(s) to one or more identification values. Alternatively, the characterizing value(s) extracted from the data packet may be used as the identification value(s). An example of the former is for example extracting an IP address from the data packet and mapping it to an authenticated user. The user information is then used for obtaining property value(s), which may indicate what the user is allowed to do or include other information that can be used to determine the firewall action like the user's personal settings about incoming traffic. In general, a characterizing value may be for example a header field value, a payload field value, an IP address (source or destination), port number (source or destination), a subscriber number, or some other characteristic value obtainable from a data packet. Accordingly, an identification value may be any one of the characterizing values or alternatively some other information that the firewall has for the data packet and can derive on the basis of the characterizing values of the data packet, such as a certificate or an authenticated user name.

The property server matches a given identification value or set of identification values to a set of property values. The identification values bind a data packet related to the identification values to a specific user, user group, server, (sub) network or other entity having its own set of property values defined. However, there is no need to maintain the information about the specific entity bound to the identification values in the property server. Instead, maintaining direct binding between the identification values (or characterizing values) and the property values of the respective entity is enough. If a set of property values is assigned to a network, the property values represent the authorisation level of all users or devices in the network. By assigning distinct property values to different IP addresses within the network, distinctive rights can be given to different users or devices.

The property value(s) may indicate a combination of allowed and disallowed services (service agreements) and connections, security level or other data that is needed in the decision making process that takes place in the firewall, which forwards or denies packets to/from the user or device. Further the property value(s) may indicate, whether the identification values are associated with a registered user or a specific company. If the entity to which property values are assigned is a server, property value may be used for indicating which services the server provides. In addition, a property value may be used if a network address translation should be done for the data packet in question. Yet another application is to determine traffic priorization according to property values instead of directly using information derived from the packets.

The identification parameter to be used for obtaining the property values may be defined for example in the rule. For example the field of a data packet from which to take a value for obtaining the property values may be given in the rule. Alternatively, the firewall may use always the same identification parameter, e.g. an IP address, and the property server may combine property values associated to the individual IP address and to the network to which the IP address belongs.

Typically, only a limited set of identification values is known to the property server. Clearly, one property server cannot have properties defined for each possible entity (within the Internet for example). This is not even necessary, since the main function of the property server is to maintain the property values of the entities, which are protected by the system to which the property server belongs. Other known entities may also be assigned a set of properties to ease the firewall administration tasks. Therefore some default set of property values is returned for the unknown identification values. The firewall basically considers these identification values (or data packets) as unknown in the filtering process. The default values may be conveyed from the property server or they may be readily defined in the firewall, in which case the property server may return only a message saying that the identification values are unknown instead of the default property values.

It is advantageous to store in the network gateway the received property value(s) together with the one or more identification values, and to use the already stored property value(s), if the property value(s) associated with the identification values, and thus with the data packet, are already stored in the network gateway, and to query the property value(s) from the property server only if they are not already stored in the network gateway. The property value(s) need to be stored (or cached) also for comparing the value(s) for more than one rule.

In order to maintain up-to-date property values in the network gateway, it is possible to request the property server to send a notification, if the property value(s) that are stored in the network gateway are updated in the property server. The property server then sends the updated property value(s) and the one or more associated identification values to the network gateway as a response to receiving updated property value(s) e.g. from a management system. The network gateway replaces the respective property value(s) in the network gateway with the updated property value(s). Alternatively, the network gateway may refresh all property values stored in the network gateway or a specific property value stored in the network gateway on timely basis by querying the current values from the property server and replacing the old values with the current values. In this case, the property values in the network gateway may not be up-to-date at all times, but depending on the refresh frequency, this may not be critical.

The network gateway may also query from the property server the current values of the property values that have been updated in the property server during a certain time period. Then, if a current value is received for a property value, which is stored in the network gateway, the property value is replaced in the network gateway with the current value. In this alternative, the network gateway may receive values for properties, which are not stored in the network gateway, but the network gateway may simply discard such values.

In a stateful firewall, history of a data packet connection is maintained. In general, only a data packet opening a connection is compared to the rule base, after which state is created and stored for the connection, and other packets of the connection are processed on the basis of the state. This can be done as in prior art also with the matching method of the invention. The property values are used for matching to a rule a data packet opening a connection, and state is created for the connection and future coming packets of the connection are processed on the basis of the state as is known in prior art.

Preferably, the property values are coded for example into a bit sequence, wherein each bit corresponds one property representing a service or other parameter that on some level defines the authorisation level of the entity (user or device) in question (for example the entity currently possessing a specific IP address) and whether the property is set or not. In this way the property values are expressed in an effective manner and the information is readily usable for the filtering process. The translation from the external presentation of the address properties can be done by the property server or directly by the firewall.

The method according to the invention of using the property values in the matching process of a firewall gives a lot more flexibility in defining and updating the rule base as well as changing the addressing of the devices in the protected network. The property values in a property server may be changed at any time without a need to reconfigure the associated firewall. The property values may be controlled via the firewall management system or it may be derived from external sources, like a service provider's customer database. Additionally, if automatic address assigning system is used, the property server may be automatically notified of address-user binding changes, or in more general level of identification value—property value (user entity) changes.

Each known server in the network can be assigned property values that describe the services it provides. This provides a flexible way to control traffic to and from large numbers of servers that can often be encountered for example in ADSL-based customer networks. With the method of the invention it is possible to flexibly set property values both for source and destination IP addresses or for other characterizing value and the property values are not be limited to user information. For example with user authentication this cannot be done.

These and other features of the invention, as well as the advantages offered thereby, are described hereinafter with reference to embodiments illustrated in the accompanying drawings.

PREFERRED EMBODIMENTS OF THE INVENTION

The present invention can be applied in any network gateway, which is processing data packets on the basis of a rule base, such network gateway may be for example a firewall, a Virtual Private Network (VPN) gateway or a security gateway. VPN gateways and security gateways are devices offering secure communications between two endpoints. They encrypt and decrypt data on the basis of instructions obtained from a rule base. The rules used in a network gateway according to the invention may be access rules, network address translation (NAT) rules, load balancing rules, rules for prioritizing data traffic, or some other rules. In the following description, a firewall is used as an example of a suitable network gateway.

The source or the destination of the data packets may be any computer device with data communication capabilities. The data connectivity of such device may be through wireless or fixed line connection. Typically such devices are servers, desktop computers, portable computer devices, such as laptop computers, PDAs, communicators, smart phones, intelligent telecommunication devices, etc.

Figures 1, 2A:
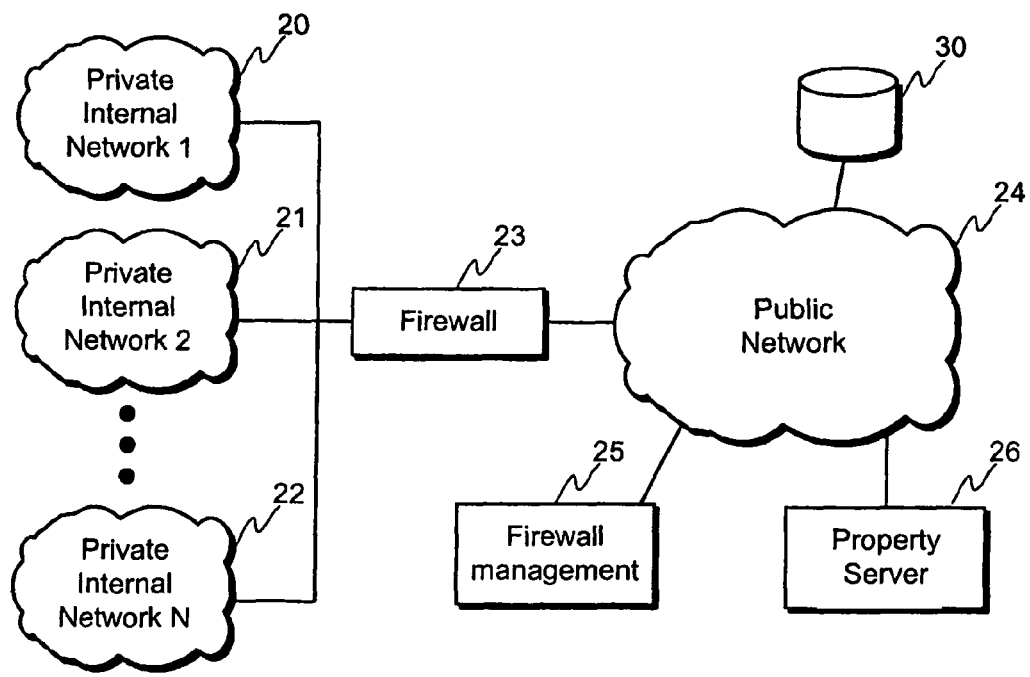
FIG. 1 illustrates an exemplary prior art rule base.
FIGS. 2A and 2B are schematic block diagrams of exemplary network configurations wherein the present invention can be applied.
Figure 2B:
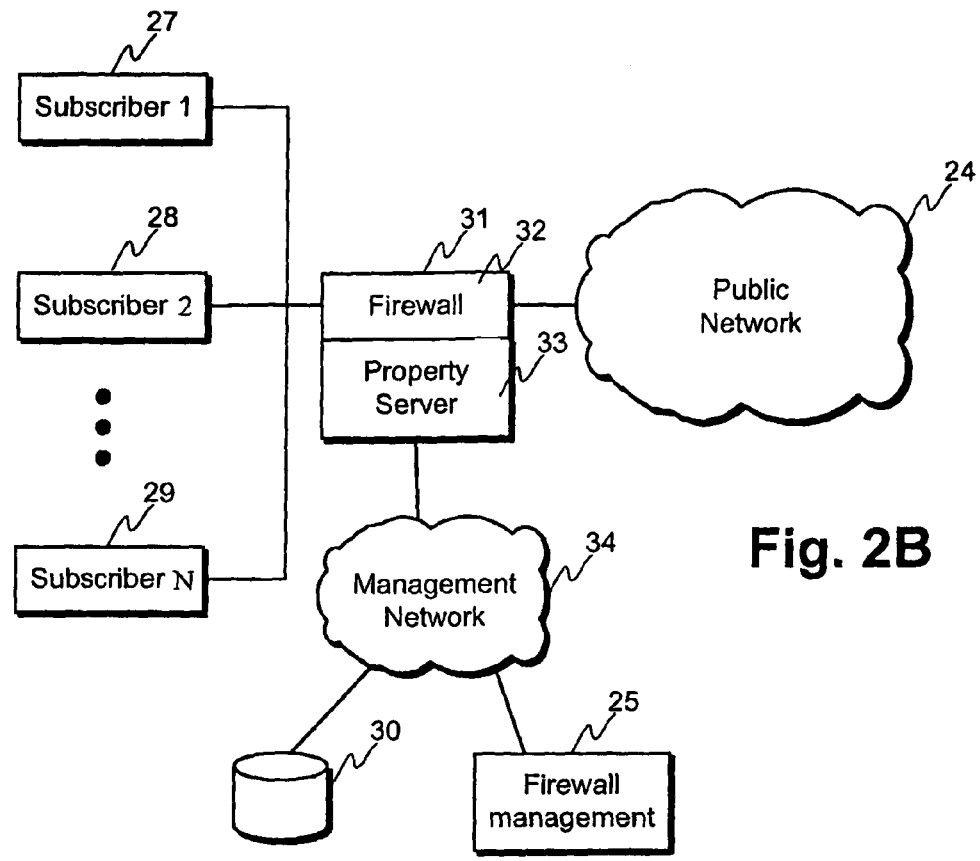

FIGS. 2A and 2B show schematic block diagrams of exemplary network configurations where the invention may be used. The configurations are shown only to facilitate the understanding and description of the present invention. The present invention is not intended to be restricted to any particular network configuration. Further, in order to improve clarity, only network elements which are somehow involved with the present invention are shown in FIGS. 2A and 2B.

As illustrated in FIG. 2A, plurality of separate internal networks 20, 21 and 22 are connected to public network 24 via a firewall 23. The firewall 23 is managed by means of a management server 25, which may be remotely connected to the firewall over the public network (preferably by using a secure connection such as SSL, Secure Sockets Layer). Alternatively, the management server might be connected directly to the firewall or the firewall might be managed by means of a management interface in the firewall itself. In general, firewall configuration (the rules), which may include also VPN configuration, is defined in the management system and conveyed to the firewall for execution.

The present invention relates to matching data packets to rules on the basis of property values. Property values are obtained from a specific external server, "a property server", on the basis of some identification values determined on the basis of a data packet. The property values describe the allowed or disallowed connections or services and specific characteristics etc. for the entity associated with the respective identification values. In FIG. 2A, the firewall 23 illustrates a network gateway, which uses property values for matching data packets to rules. The firewall 23 obtains the property values it uses from the property server 26. Preferably, the property values are coded for example into a bit sequence, wherein each bit corresponds one property representing a service or other parameter that on some level defines the authorisation level of the entity in question (for example a user or a device currently possessing a specific IP address) and whether the property is set or not. In this way the property values are expressed in an effective manner and the information is readily usable for the filtering process.

Physically the property server 26 is a device with appropriate software to do the tasks assigned to it. It can be for example a personal computer (PC), a work station, a simple LDAP (Lightweight Directory Access Protocol) server, an SQL (Structured Query Language) database installed on some suitable device, or whatever that can be used for such purposes. The property values may be loaded into the property server for example from a customer database 30 or from the firewall management 25 of FIG. 2A. The property server may include functionality for coding the bit sequence of certain property values, or it may simply convey the property values to the firewall, which then codes the bit sequence for the match process. Alternatively the property server may be mere storage for the property value bit sequences, that is, the property server receives the bit sequences from some external server and possibly from many different servers. Still further, the property server may query some suitable values from some external servers to be used as property values according to the invention.

FIG. 2B illustrates a similar network configuration to the configuration of FIG. 2A. Now plurality of individual subscribers (of the service) or users 27, 28 and 29 are connected to the public network 24 via a firewall system 31, which includes a firewall 32 and a property server 33 in the same device. In this case, the property server may be for example an SQL database. The firewall system 31 is additionally connected to a management network 34 (which may be for example a private network of an MSSP). The firewall management 25 and customer database 30 are now located in the management network 34, but their operation is similar to the operation in connection with the configuration of the FIG. 2A.

Naturally, the coupling between the private networks and the public network 24 may include also routers and Internet service providers (ISPs not shown in FIGS. 2A and 2B). As is well known in the art, the private networks 20, 21 and 22 may be, for example, a company networks, such as a local area network (LAN) which connects users and resources, such as workstations, servers, printers and the like of the company. The subscribers 27, 28 and 29 may be, for example, ADSL subscribers or subscribers of a wireless network such as GSM, GPRS or UMTS network.

As already described above, the firewall 23 and 31 are gateways which operate at the same time as a connector and a separator between the networks in a sense that the firewalls keep track of the traffic that passes through them from one network to another and restrict connections and packets that are defined as unwanted by the administrators of the systems. Physically a firewall is a device with appropriate software to do the tasks assigned to it. It can be a router, a personal computer (PC), or whatever that can be used for such purposes.

Figure 3A:
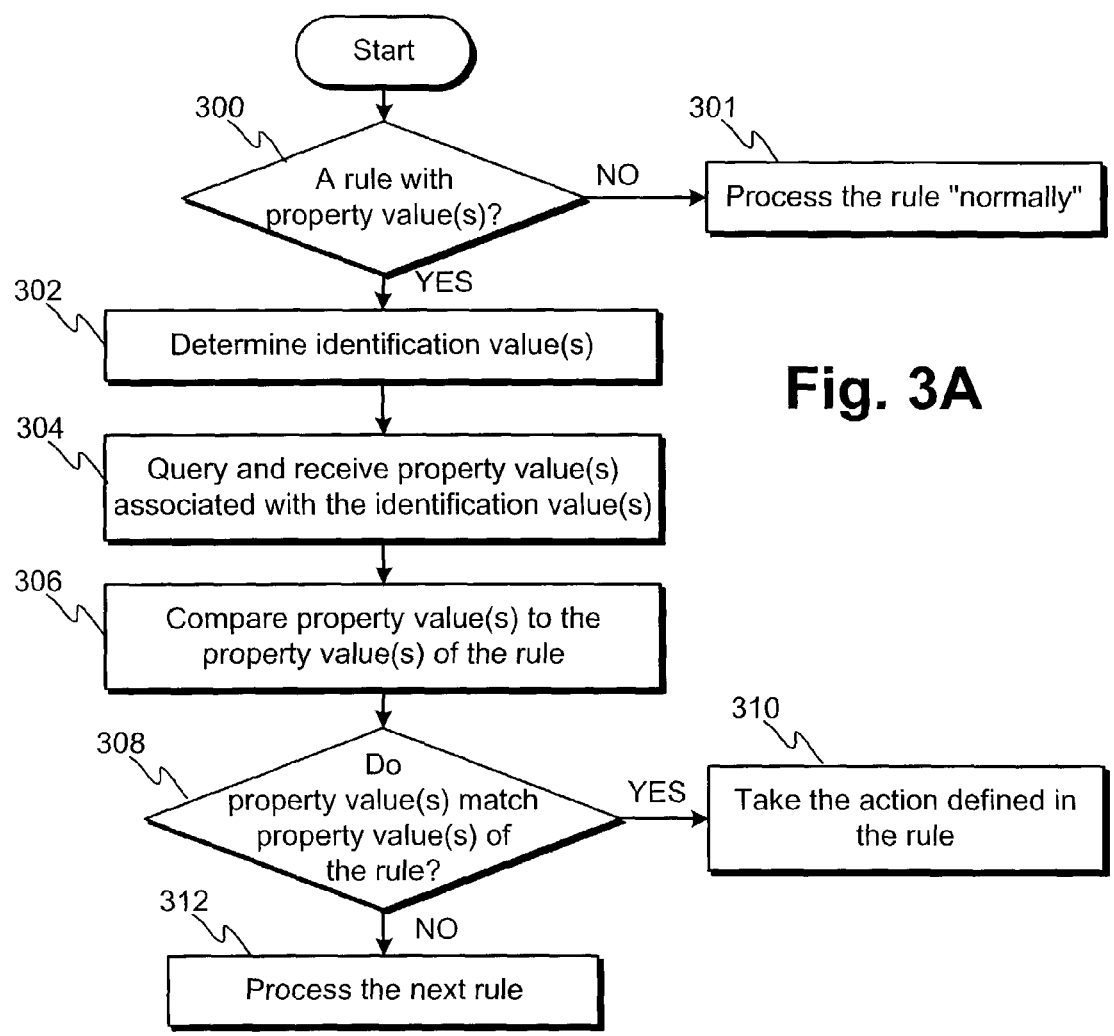
FIG. 3A is a flow diagram illustrating operation according to one aspect of the invention.

FIG. 3A is a flow diagram illustrating operation according to one aspect of the invention. In step 300, it is detected, if a data packet, which has been received, is compared to a rule containing property values (that is, requiring the use of property values for match process). If property values are not required, the rule is processed normally in step 301. Normal processing means comparing some characteristics of the data packet to the rule as is known in prior art. One or more identification values are determined on the basis of the data packet (step 302) and property value(s) associated with the identification value(s) are queried and received (step 304). In practice, the property values are stored in the firewall for future use after receiving them. If the property values are already stored, they do not need to be queried again. Then the property value(s) are compared to a rule, which includes property value(s) and an action, in step 306. If the property value(s) of the rule match corresponding property value(s) associated with the identification value(s), the action defined in the rule is taken (steps 308 and 310). If the property value(s) of the rule do not match corresponding property value(s) associated with the identification value(s), the next rule of the rule base is processed in step 312. It must be noted herein, that there may not be "normal" (or traditional) rules in the rule base at all, when the process may start straight from the step 302.

Figure 3B:
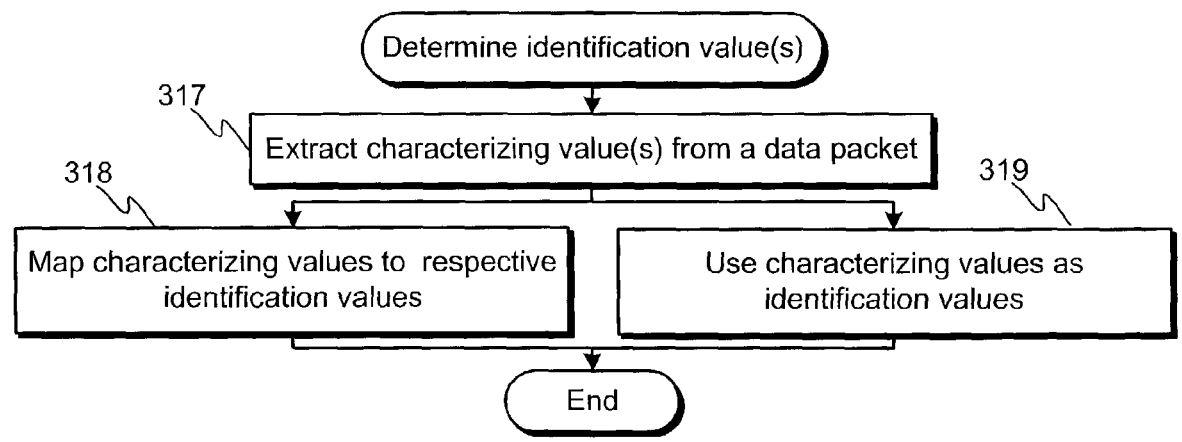
FIG. 3B is a flow diagram illustrating exemplary methods for determining identification value(s)

FIG. 3B is a flow diagram illustrating exemplary methods for determining identification value(s) according to the invention. In step 317, one or more characterizing values are extracted from a data packet. Then these characterizing values are mapped to one or more identification values in step 318 or used as identification value(s) as such in step 319.

Figure 4A:
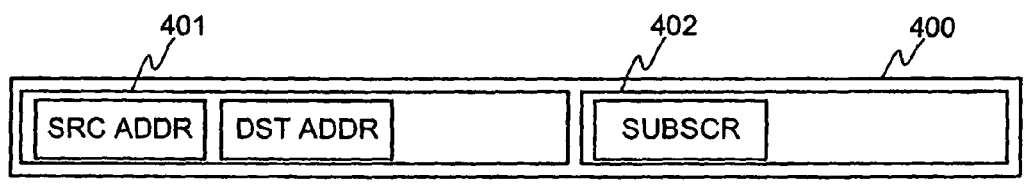
FIG. 4A illustrates a data packet and some exemplary data fields, which may be used according to the invention.

FIG. 4A illustrates a data packet 400 and some exemplary data fields, which can be used for obtaining the identification values according to the invention. An identification value may be taken from the header part 401 of the data packet or form the payload part 402. For example, source or destination addresses SRC ADDR, DST ADDR may be taken from the header part and subscriber number SUBSCR may be taken from the payload part.

In the following, the invention is illustrated by means of an example set of property values and an exemplary rule base. Six property values are defined for an entity. The property values tell, if outbound and inbound TCP connections and proxy services are allowed for the entity, whether the entity is a user of a specific service, whether the user has prepaid SMS service enabled and whether the entity provides HTTP service. The following values are assigned to an entity (a user) of our example:

| Bit | Description | Value |
|-----|-------------|-------|
| 0 | outbound TCP | 1 |
| 1 | inbound TCP | 0 |
| 2 | proxy services | 1 |
| 3 | is a user | 1 |
| 4 | prepaid SMS | 0 |
| 5 | HTTP service in this address | 0 |

That is, outbound TCP connections and proxy services are allowed for the entity and the entity is a user. Thus, the bit sequence of property values associated with the entity is 101100.. Let's assume that the entity is using the IP address 10.1.1.7.

Figures 4B, 5:
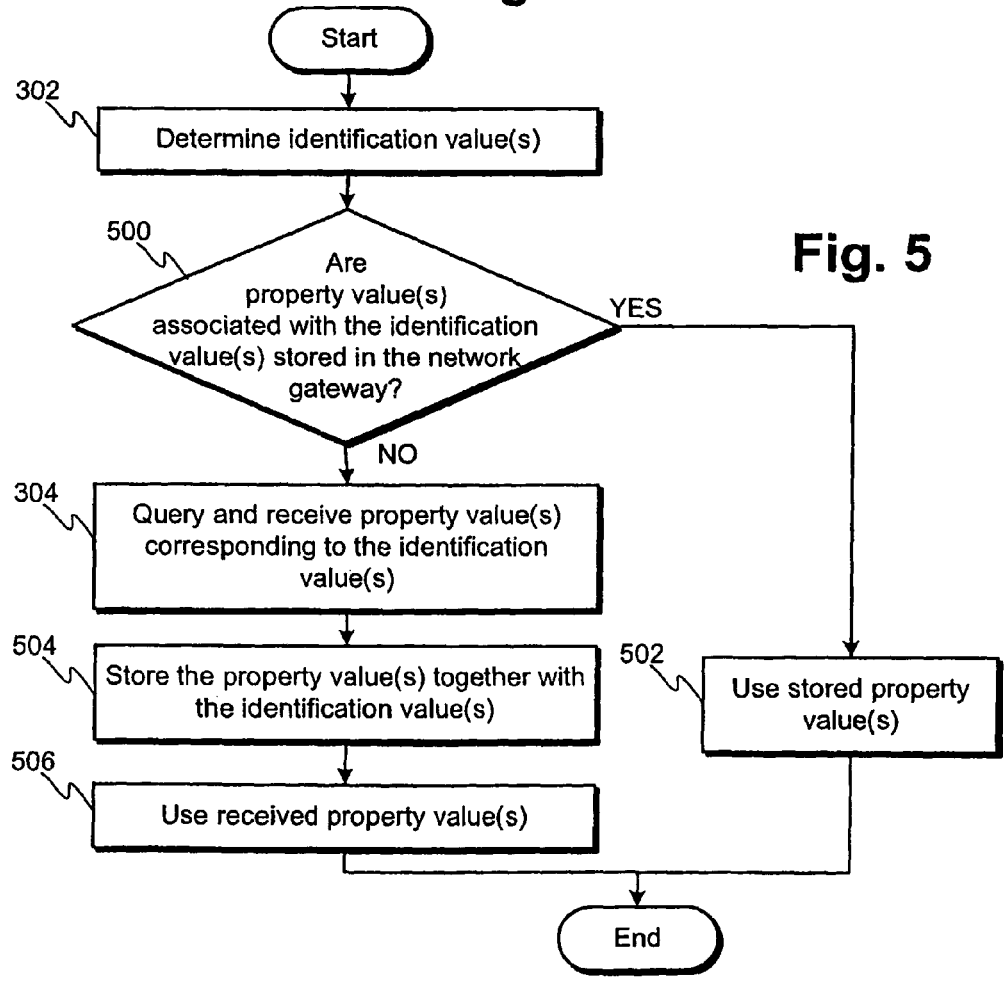
FIG. 4B illustrates an exemplary rule base according to the invention.
FIG. 5 is a flow diagram illustrating an exemplary method for obtaining the property value(s)

The exemplary firewall rule base is illustrated in FIG. 4B. There are N "traditional" or "normal" rules (not shown in the Figure) in the beginning of the rule base. The purpose of these traditional rules is for example to facilitate the firewall's own operation, such as connectivity with a management system. Then there are four new kind of rules N+1, N+2, N+3. and N+4 show, after which rules there may be still more "traditional" rules in the rule base. Similarly, there could be more new kind of rules in the end of the rule base or there could be traditional rules among the rules according to the invention.

In this example, it is required that some bits in the property value sequence are set. Other than those bits may be either set or not. The comparison of the property value sequence associated with a data packet and of a rule a simple bitwise AND operation. As is well known in the art also other bit operations can be easily used for the comparison, and it is also possible to require that some bits are not set instead of just requiring that some bits are set. Additionally, it could be required that at least bit X or bit Y needs to be set (or is not allowed to be set) or that the property value sequence associated with a data packet fully matches the property value sequence in a rule (that is, all bits are equal in the sequences).

When the firewall has compared a data packet to N first rules and none of them has matched the data packet, it is required to find out the property values associated with the source of the data packet. The firewall queries the property values from the property server by the source IP address 10.1.1.7. and receives the sequence of 101100. mentioned above.

The rule N+1. allows HTTP-proxy connections to a designated HTTP proxy server at 192.168.1.2, if the source IP address is in network 10.1.1.0/24, the protocol used is HTTP-Proxy, and the bits 2 (proxy services allowed) and 0 (any outbound TCP connections allowed) in the property bits are set. Considering that the entity of our example is the source of such a connection, the connection is allowed, since bits 0 and 2 are set in our example entity and the IP address of our entity 10.1.1.7. belongs to the network 10.1.1.0/24.

If the rule N+1. does not match, the property value sequence cached in the previous step is used and compared to the rule N+2.. This rule denies any HTTP connections, if the sending entity has property bit 3 set (meaning that the entity is defined to be a user, for example, a user of a specific service, such as an ADSL subscriber is a user of ADSL service).

Note that the rule base may override the property value settings. Even though the property values say "any" outgoing TCP connection is allowed for the entity of our example, it is possible to configure the firewall to deny direct HTTP connections as is done in the rule N+2. for some specified sources. (HTTP is implemented on top of TCP, and is thus TCP traffic.) Thus the property values are just information that can be used in the filtering process, not a filtering policy per se. However, the firewall rule base may configured also so that it fully conforms with property values, irrespective of what the property values are.

Similarly, rule N+3. allows FTP connections to any destination for entities with the bit 0 set and rule N+4. allows any TCP connection to a destination, for which the bit 1 is set. The allowed destination of rule N+4. could be for example an ADSL user with a service agreement that allows inbound connections. For the entity of our example, incoming TCP connections are not allowed, and therefore the processing would proceed to the next rule, if the entity of our example would be considered as a destination of the rule.

The rule base of FIG. 4B is not intended to describe any practical configuration, but only to illustrate some possibilities offered by the invention. As these example rules show, the property value matches according to the invention can be mixed and matched with traditional IP address -based matches even within one rule.

Note that after rule N+1. the property information does not need to be queried again. Also, until the property server informs the firewall (or a specified timeout is passed), the identification value—property value binding (such as IP address—property value binding) can be considered valid as is described in more detail below. This improves the performance significantly and provides flexibility in changing the property values associated with some identification value (and thus with some user or other entity). If some property value or some identification value pointing to specific property values changes, it is not necessary to change the rule base in the firewall (which is performance-wise a costly operation compared to fetching property values for an identification value again).

FIG. 5 is a flow diagram illustrating an exemplary method for obtaining the property value(s). In step 302, identification values are determined on the basis of the data packet similarly to FIG. 3. In step 500, it is checked if the property value(s) associated with the identification values are already stored in the network gateway. If that is the case, the stored property values are used in step 502. Otherwise, the property values are queried from the property server in step 304, stored in the network gateway in step 504, and the received property values are used in step 506.

Figure 6:
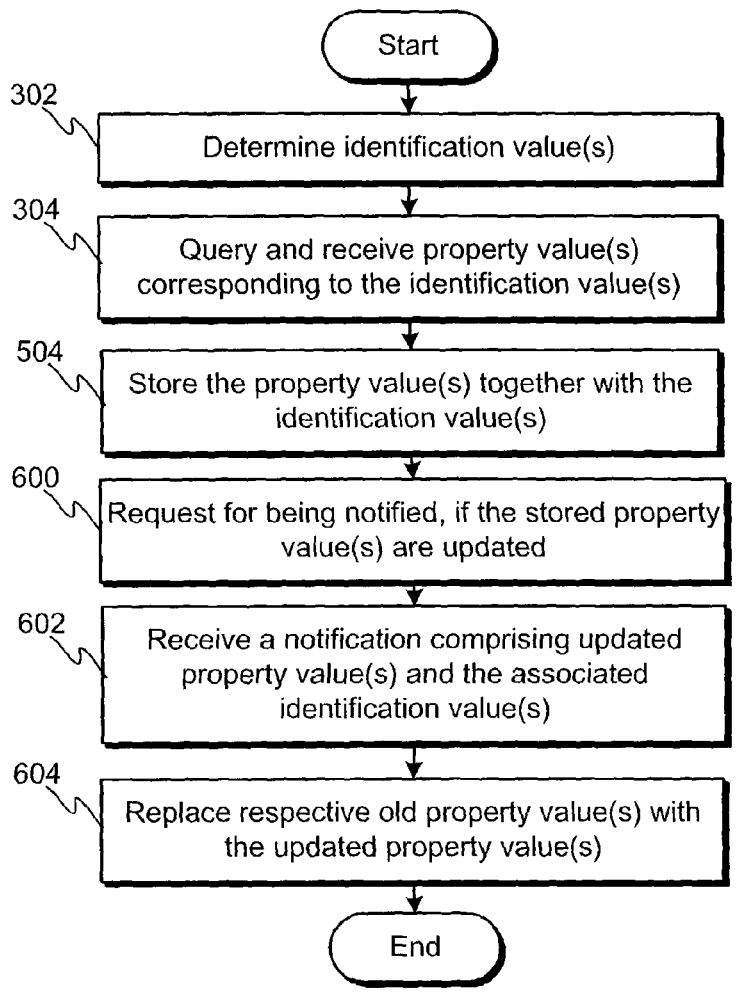
FIG. 6 is a flow diagram illustrating an exemplary method for obtaining updated property value(s)

FIG. 6 is a flow diagram illustrating an exemplary method for obtaining updated property value(s) in the network gateway. Equally to the above description, identification value(s) are determined on the basis of the data packet (step 302). Property value(s) are queried from the property server and stored in the network gateway (steps 304 and 504). In step 600, the network gateway requests to be notified, if the property value(s) stored in the network gateway in step 504 are updated in the property server. At this point such a request needs to be stored in the property server with reference to the corresponding property value—identification value combination (not shown in the Figure). In step 602, a notification comprising updated property value(s) and associated identification value(s) are received. The old property value(s) in the network gateway are then replaced with the corresponding updated property value(s) in step 604.

Figure 7:
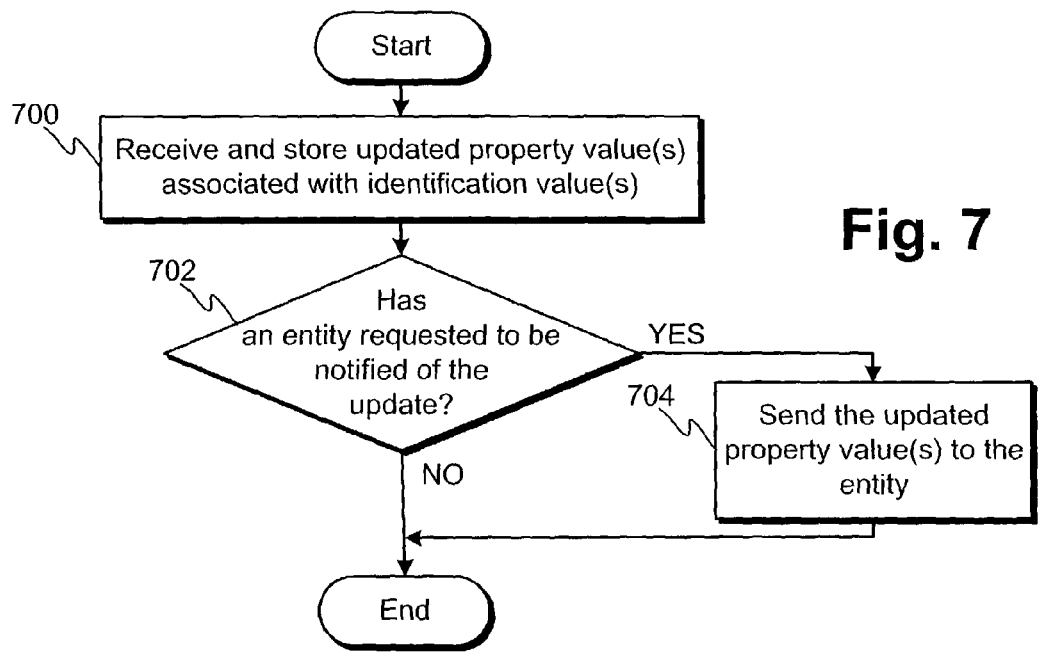
FIG. 7 is a flow diagram illustrating an exemplary method for delivering updated property value(s)

FIG. 7 is a flow diagram illustrating an exemplary method for delivering updated property value(s) from the property server to the firewall or some other network gateway. In step 700, the property server receives and stores updated property value(s), which are associated with some identification value(s). In step 702, it is checked if any entity (e.g. a firewall or some other network gateway) has requested to be notified of the update in question. If such a request exists, the updated property values are sent to the requesting entity accompanied with the associated identification values in order the network gateway be able to know which property values are updated in step 704.

Another method that can be used to facilitate refreshing the property values stored in the firewall is fetching the property values stored in the firewall from the property server as a single query or as a block of queries. This can be done as needed or with a fixed frequency.

Figure 8A:
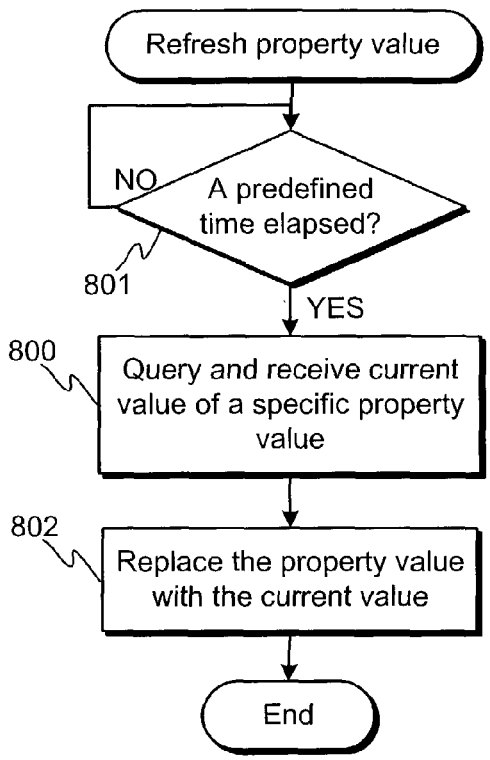
FIGS. 8A to 8C are flow diagrams illustrating exemplary methods for refreshing property value(s) in a network gateway.
Figure 8B:
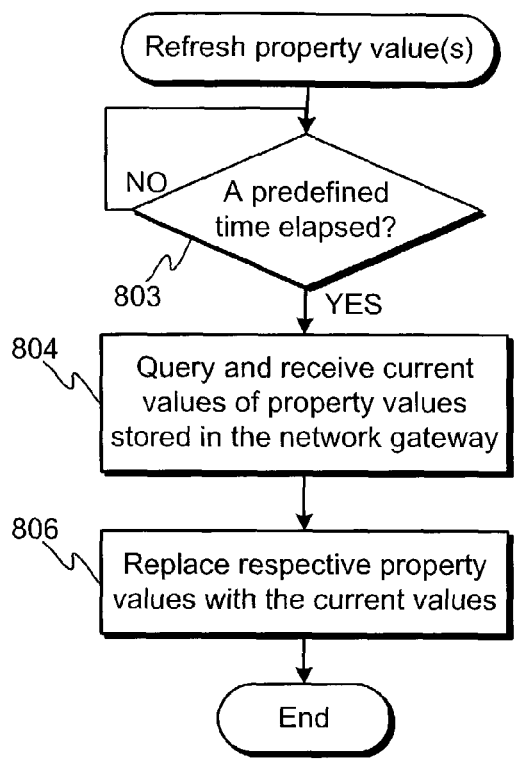
Figure 8C:
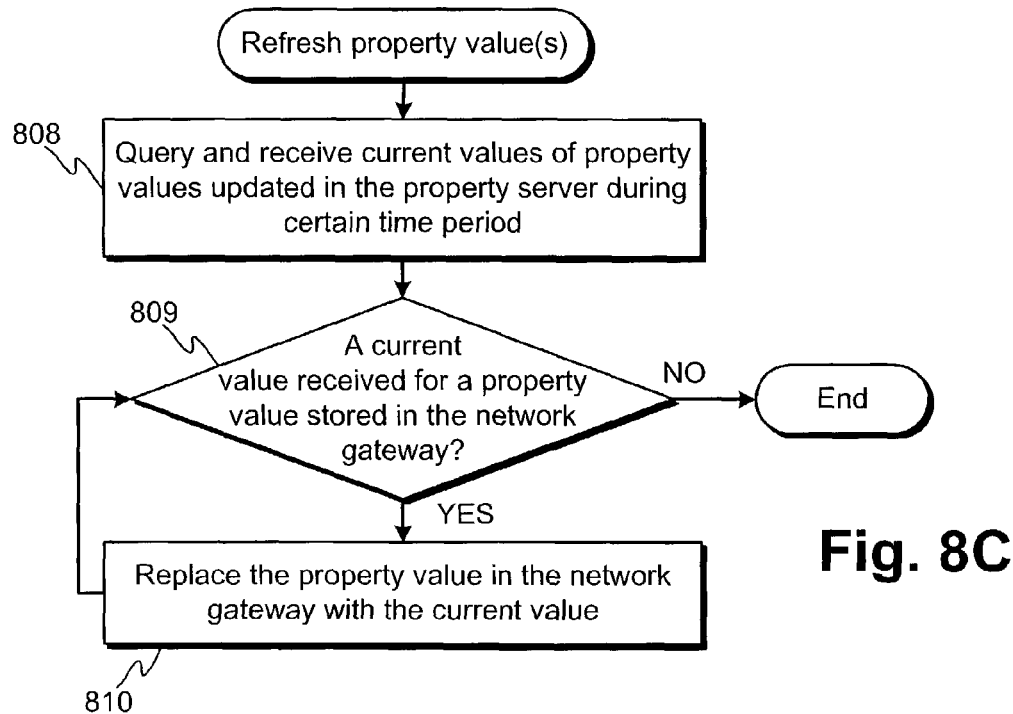

FIGS. 8A to 8C are flow diagrams illustrating exemplary methods for refreshing property value(s) stored in the network gateway. In FIG. 8A it is first detected, if a predefined time has elapsed since a specific property value was refreshed the last time, in step 801. If the time has elapsed, current value of the specific property value (or of a set of specific property values) is queried and received from the property server and the property value stored in the network gateway is replaced with the current value, steps 800 and 802. Of course, the stored property value does not need to be replaced, if the value has not changed since the last refresh.

FIG. 8B is similar to FIG. 8A, but now all property values stored in the network gateway are queried at a time, as a bunch of queries or in a single query. If a predefined time has elapsed since the last refresh in step 803, current values of the property values stored in the network gateway are queried and received in step 804. The property values stored in the network gateway are then replaced with the current values in step 806.

In FIG. 8C, the current values of the property values which have been updated in the property server during a predefined time period (e.g. during last 10. minutes) are queried and received in step 808. In this solution, the network gateway may receive values for properties it is not storing, and therefore it is checked if a received new value is a value for a property value stored in the network gateway in step 809. If that is the case, the respective value is replaced with the new value in step 810. Received values, which are not needed in the network gateway, are for example discarded.

It should be understood that the disclosed method for providing a routine of matching a data packet to a rule of the base may be performed using computer software contained in a computer-readable medium.

It must be appreciated that the embodiments described above are given as examples only, while the features described in one example may be combined with features of another example and various modifications can be made within the scope and spirit of the invention as defined in the appended claims.

The invention claimed is:

1. A method of matching a data packet to a rule in a network gateway having a rule base, comprising
    determining, by a network gateway, one or more identification values on the basis of the data packet,
    querying and receiving, by the network gateway, property values associated with said one or more identification values, said property values being coded into a bit sequence, wherein each bit of the sequence represents a value of a different property and indicates whether the respective property is set or not,
    comparing, by the network gateway, said -queried bit sequence to at least one rule in a rule base associated with the network gateway, said at least one rule comprising a bit sequence and an action, and
    taking the action defined in said at least one rule, if said bit sequence of the rule match the queried bit sequence corresponding property values associated with said one or more identification values.

2. A method according to claim 1, wherein the property values are queried from a predefined property server.

3. A method according to claim 2, further comprising
    storing in the network gateway the received property values together with the one or more identification values, and wherein the step of querying comprises
    using the already stored property values, if the property values associated with the one or more identification values are already stored in the network gateway, and otherwise querying the property values from the property server.

4. A method according to claim 3, further comprising
    requesting the property server to send a notification, if the property values that are stored in the network gateway are updated in the property server,
    receiving from the property server a notification comprising updated property values and the one or more associated identification values, and
    replacing the respective property values in the network gateway with the updated property values.

5. A method according to claim 3, further comprising querying and
    receiving from the property server the current value of a specific property value that is stored in the network gateway after a predefined time has elapsed since the specific property value was queried the last time, and replacing the specific property value in the network gateway with the received current value.

6. A method according to claim 3, further comprising querying and receiving from the property server the current values of the property values that are stored in the network gateway after a predefined time has elapsed since the property values were queried the last time, and replacing the respective property values in the network gateway with the received current values.

7. A method according to claim 3, further comprising querying and receiving from the property server the current values of the property values that have been updated in the property server during a certain time period, and if a current value is received for a property value, which is stored in the network gateway, replacing the property value in the network gateway with the current value.

8. A method according to claim 1, wherein determining said one or more identification values comprises extracting one or more characterizing values from the data packet and mapping the characterizing values to one or more identification values.

9. A method according to claim 1, wherein determining said one or more identification values comprises extracting one or more characterizing values from the data packet and using the one or more characterizing values as the one or more identification values.

10. A method according to claim 1, wherein the rule is an access rule, a network address translation rule, load balancing or a traffic prioritization rule.

11. A method according to claim 1, wherein the identification parameter to be used for querying property values is defined in a rule of the rule base.

12. A method according to claim 1, wherein identification value is a source address, a destination address, a source port, a destination port, a user identifier, or a subscriber number.

13. A method according to claim 1, wherein a characterizing value is a source address, a destination address, a source port, a destination port, a user identifier, or a subscriber number.

14. A method according to claim 1, wherein the property values indicate a combination of allowed and/or disallowed services.

15. A method according to claim 1, wherein the property values indicate, if the identification values are associated with a registered user or with a specific company.

16. A method according to claim 1, wherein the property values indicate provided services.

17. A method according to claim 1, wherein the property values indicate, if the identification values are associated with a network address translation (NAT) rule.

18. A network gateway comprising:

memory that stores both a rule base, and software that matches a data packet to a rule of the rule base, wherein the software is configured to:

determine one or more identification values on the basis of the data packet, query and receive property values from a property server, the property values being associated with said one or more identification values, said property values being coded into a bit sequence, wherein each bit of the sequence represents value of a different property and indicates whether the respective property is set or not, compare said queried bit sequence to at least one rule in the rule base, said at least one rule comprising a bit sequence and an action, and take the action defined in said at least one rule, if said bit sequence of the rule match said queried bit sequence corresponding property values associated with said one or more identification values.

19. A property server, comprising memory for storing property values in association with one or more identification values, said property values being coded into a bit sequence, wherein each bit of the sequence represents value of a different property and indicates whether the respective property is set or not, mechanism for receiving from a network gateway a query for property values associated with certain one or more identification values, mechanism for sending to the network gateway the property values coded into a bit sequence and associated with certain one or more identification values as a response to the query, to be used in the network gateway for matching a data packet to a rule, said one or more identification values having been determined on the basis of the data packet, mechanism for receiving from the network gateway a request to send a notification, if the property values associated to certain identification values are updated in the property server, and mechanism for sending said notification to the network gateway, as a response to receiving updated property values coded into a bit sequence and associated to say certain identification values, said notification comprising the updated property values and the associated identification values.

20. A non-transitory computer-readable medium, containing a computer software which, when executed in a computer device having a rule base, causes the computer device to provide a routine of matching a data packet to a rule of the rule base, said routine comprising determining one or more identification values on the basis of the data packet, querying and receiving property values associated with said one or more identification values, said property values being coded into a bit sequence, wherein each bit of the sequence represents value of a different property and indicates whether the respective property is set or not, comparing said property values to at least one rule in the rule base, said at least one rule comprising property values and an action, and taking the action defined in said at least one rule, if said property values of the rule match corresponding property values associated with said one or more identification values.

* * * * *